United States Patent
Ma et al.

(10) Patent No.: US 9,411,402 B2
(45) Date of Patent: Aug. 9, 2016

(54) POWER CONTROL SYSTEM AND POWER CONTROL METHOD

(71) Applicant: GIGA-BYTE TECHNOLOGY CO., LTD., New Taipei (TW)

(72) Inventors: Mou Ming Ma, New Taipei (TW); Chun Kun Lan, New Taipei (TW); Yih Neng Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 350 days.

(21) Appl. No.: 14/080,310

(22) Filed: Nov. 14, 2013

(65) Prior Publication Data

US 2014/0143574 A1    May 22, 2014

(30) Foreign Application Priority Data

Nov. 21, 2012    (TW) .............................. 101143362 A

(51) Int. Cl.
*G06F 1/26* (2006.01)
*G06F 1/32* (2006.01)
*G06F 11/14* (2006.01)

(52) U.S. Cl.
CPC .............. *G06F 1/3234* (2013.01); *G06F 1/266* (2013.01); *G06F 1/3287* (2013.01); *G06F 1/3293* (2013.01); *G06F 1/3203* (2013.01); *G06F 1/3206* (2013.01); *G06F 11/1417* (2013.01); *Y02B 60/121* (2013.01); *Y02B 60/1282* (2013.01)

(58) Field of Classification Search
CPC ..... G06F 1/3203; G06F 1/266; G06F 1/3287; G06F 1/3206; G06F 13/4022
USPC .................................. 713/300, 310, 320, 323
See application file for complete search history.

(56) References Cited

U.S. PATENT DOCUMENTS

| | | | |
|---|---|---|---|
| 2004/0083397 A1* | 4/2004 | Chen ..................... | G06F 1/3203 713/320 |
| 2013/0124886 A1* | 5/2013 | Kung .................... | G06F 1/3206 713/320 |

FOREIGN PATENT DOCUMENTS

| | | |
|---|---|---|
| TW | 201128375 A1 | 8/2011 |
| TW | 201203271 A1 | 1/2012 |
| TW | 201239602 A1 | 1/2012 |

* cited by examiner

*Primary Examiner* — Michael J Brown
(74) *Attorney, Agent, or Firm* — Maschoff Brennan

(57) ABSTRACT

A power control system and a power control method are provided. The power control system is adapted to a computer device. The computer device comprises an embedded controller and a power supply both coupled to each other. The power supply provides power to the embedded controller. The power control system comprises a device switch input terminal and a logic output terminal. The device switch input terminal receives a trigger signal from a component of the computer device to change a state of the computer system. The logic output terminal is coupled to the power supply and performs on-off control of the power supply to provide or stop power to the embedded controller when the switch input terminal receives the trigger signal.

9 Claims, 6 Drawing Sheets

POWER CONTROL SYSTEM AND POWER CONTROL METHOD

CROSS-REFERENCES TO RELATED APPLICATIONS

This non-provisional application claims priority under 35 U.S.C. §119(a) on Patent Application No. 101143362 filed in Taiwan, R.O.C. on Nov. 21, 2012, the entire contents of which are hereby incorporated by reference.

BACKGROUND

1. Technical Field

This disclosure relates to a power control system and a power control method, especially to a power control system and a power control method for an embedded controller in a computer device.

2. Description of Related Art

There are increased number of global and regional regulations relating to the power management of electronic devices with the improvement of people's consciousness of environmental protection. The electronic device manufacturers are devoted to develop more energy-saving products without sacrificing the performance thereof while complying with the regulations. For portable products like notebook computers and mobile phones, less power consumption means prolonged usage time and standby time and could be a powerful feature.

According to the latest "advanced configuration and power interface (ACPI)" specification (which is an open standard for device configuration and power management by the operating system) published in year 2011, five power states are defined for an ACPI-compliant computer device.

S0: Working, where monitor is off but background tasks are running

S1: All processor caches are flushed, and the CPU(s) stops executing instructions. Power to the CPU(s) and RAM is maintained, while devices that do not indicate they must remain on may be powered down.

S2: CPU is powered off, while other devices are powered on.

S3: Commonly referred to as standby, sleep, or suspend to RAM that still remains powered.

S4: Hibernation or Suspend to Disk. All content of main memory is saved to non-volatile memory such as a hard drive and is powered down.

S5: Soft Off. No previous content is retained, so a full reboot is required. Other components may remain powered so the computer can "wake" on input from the keyboard, clock, modem, LAN, or USB device.

As described above, an "inactive" computer device may be in the suspend-to-RAM state, the suspend-to-disc state, or the shutdown state.

Besides, according to the "directive of eco-design requirements of energy-using product (EuP)" regulated by European Union, the electronic products sold in all member states should have a power consumption of no more than 0.5 watts in the off state as of Jan. 7, 2013. For a computer device in the off state, the mainboard therein and the power supply adapter (AC adapter) for example are even energy-consuming. Therefore, it is preferable for a mainboard to have a power consumption of 0.25 watts to leave a margin for the power supply adapter.

In the state-of-the-art, an embedded controller in the computer device, though in the shutdown state, is still energy-consuming. The embedded controller serves to control peripheral input/output accessories of the computer device like keyboards, computer mice, touch pads, compact-disc recorder, universal serial bus (USB), etc., when the computer device is started or switched off. The embedded controller is generally powered by a switching power supply circuit which can offer more than 90% of the power conversion efficiency if the load current is large enough. Besides, the use of the switching power supply circuit is beneficial to facilitate the design of the heat dissipation device of the computer device. However, when the load current is relatively small, for example only several milli-ampere, the power conversion efficiency of the switching power supply circuit may be worse than that of a linear regulator. Thus, the power consumption ratio of the embedded controller to the entire computer device is relatively significant when in shutdown state.

SUMMARY

In view of above problems, this disclosure provides a power control system and method which decreases the power consumption of a computer device in a shutdown state by cutting the power of an embedded controller in a computer device.

In one embodiment, a power control system is disclosed for a computer device comprising an embedded controller and a power supply both coupled to each other. The power supply provides power to the embedded controller. The power control system includes a switch input terminal and a logic output terminal. The switch input terminal receives a trigger signal from a component of the computer device to change a state of the computer device. The logic output terminal is coupled to the power supply and performs on-off control of the power supply to provide or stop power to the embedded controller when the switch input terminal receives the trigger signal.

In another embodiment, a power control system is disclosed which is for a computer device comprising an embedded controller and a power supply. The power supply provides power to the embedded controller. The embedded controller comprises a first input terminal, a first output terminal and a second output terminal, the power control system comprises a switch input terminal, a first latch, and an enabling logic. The first latch comprises a first enabling input terminal, a first latch output terminal and a first reset terminal. The first enabling input terminal is coupled to the switch input terminal. The first latch output terminal is coupled to the first input terminal. The first reset terminal is coupled to the second output terminal. When the first enabling input terminal receives a trigger signal through the switch input terminal from a component of the computer device to change a state of the computer device, the first latch output terminal outputs a second logic level. And when the first reset terminal receives a reset signal, the first latch output terminal outputs a first logic level. The enabling logic comprises a first logic input terminal, a second logic input terminal and a logic output terminal. The first logic input terminal is coupled to the first latch output terminal. The second logic input terminal is coupled to the first output terminal. The logic output terminal is coupled to the power supply and performs on-off control of the power supply. When any one of the input terminals of the control logic receives the second logic level, the enabling logic outputs an enabling signal through the logic output terminal to turn on the power supply. And when all the input terminals of the enabling logic receive the first logic level, the enabling logic outputs a disabling signal to turn off the power supply. When the embedded controller is turned on and finishes initialization, the first output terminal outputs the second logic level, and the second output terminal outputs the reset signal. When the switch input terminal receives the trigger signal again to render the first latch output terminal outputting the second logic level, the first output terminal outputs the first logic level and the second output terminal outputs the reset signal.

In still another embodiment, a power control method for a computer device is disclosed. The method comprises the following steps. An enabling signal is transmitted by a power control system to turn on a power supply if the computer device is in a suspend-to-RAM state, a suspend-to-disc state, or a shutdown state and a trigger signal is detected by the power control system. Next, the embedded controller is powered and initialized using the power supply. A first input signal is transmitted from the power control system in response to the trigger signal to the embedded controller. A first signal is then transmitted from the embedded controller to the power control system for notifying the power control system of keeping the enabling signal when the initialization of the embedded controller is finished. Then, a power-on process of the computer device is executed and the first input signal is reset by the embedded controller. The first input signal is transmitted from the power control system for notifying the embedded controller of executing a shut-down process of the computer device if the power control system detects the trigger signal again. A second signal is transmitted form the embedded controller for notifying the power control system of stopping keeping the enabling signal, thereby turning off the power supply and stopping the power of the embedded controller when the shut-down process is finished.

These and other objectives of this disclosure will no doubt become obvious to those of ordinary skill in the art after reading the following detailed description of the preferred embodiments that is illustrated in the various figures and drawings.

DETAILED DESCRIPTION OF THE EMBODIMENTS

Figure 1:
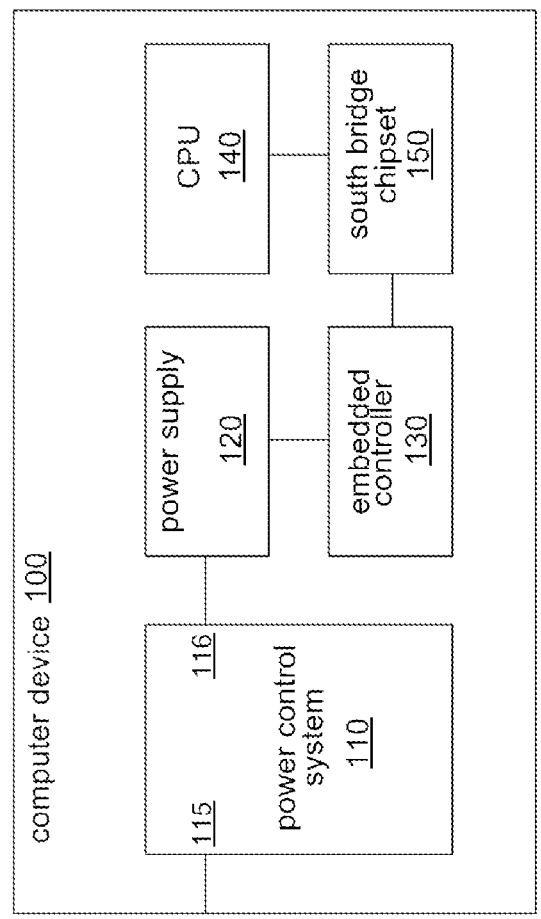
FIG. 1 is a block diagram of a power control system of a first embodiment.

FIG. 1 is a block diagram of a power control system 110 of a first embodiment. The power control system 110 is adopted in a computer device 100 which can be but not limited to a desktop computer, a notebook computer, an electronic pad device, or a high-speed electronic, magnetic, optical or electronic chemical data processing unit with functions of processing logic operations and/or algorithmic operations, storage, data input and data output. The computer device 100 of the first embodiment includes the power control system 110, a power supply 120, an embedded controller 130, a central processing unit 140 and a south-bridge chipset 150.

As shown in FIG. 1, the power supply 120 is coupled to the embedded controller 130. The power supply 120 provides power to the embedded controller 130 for the operation thereof. The power control system 110 of the first embodiment includes a switch input terminal 115 and a logic output terminal 116. The switch input terminal 115 receives a trigger signal from a component of the computer device 100 to change a state of the computer device, for example changing from a normal state to a suspend-to-RAM state, a suspend-to-disc state, or a shutdown state. Said component could be but not limit to an external push-button or an external dual in-line package switch or an internal timer. The trigger signal could be but not limit to a pulse with a finite width or a digital logic signal.

The logic output terminal 116 is coupled to the power supply 120 and performs on-off control of the power supply 120. That is, when the power supply 120 receives an enabling signal from the logic output terminal 116, the power supply 120 turns on and provides required power to the embedded controller 130, then the embedded controller begins initialization. After finishing initialization, the embedded controller 130 executes other default processes such as informing the south-bridge chipset 150 which is in charge of the power management of the computer device 100 to provide required power to the central processing unit 140. And when there's a disabling signal on the logic output terminal 116, the power supply 120 shuts down and further stops required power for the embedded controller 130 to further save the unnecessary power consumption.

In summary, when the switch input terminal 115 receives the trigger signal, the logic output terminal 116 turns on or turns off the power supply 120 accordingly to provide or stop power to the embedded controller 120 and further optimizes the power consumption of the computer device 100.

Figure 2:
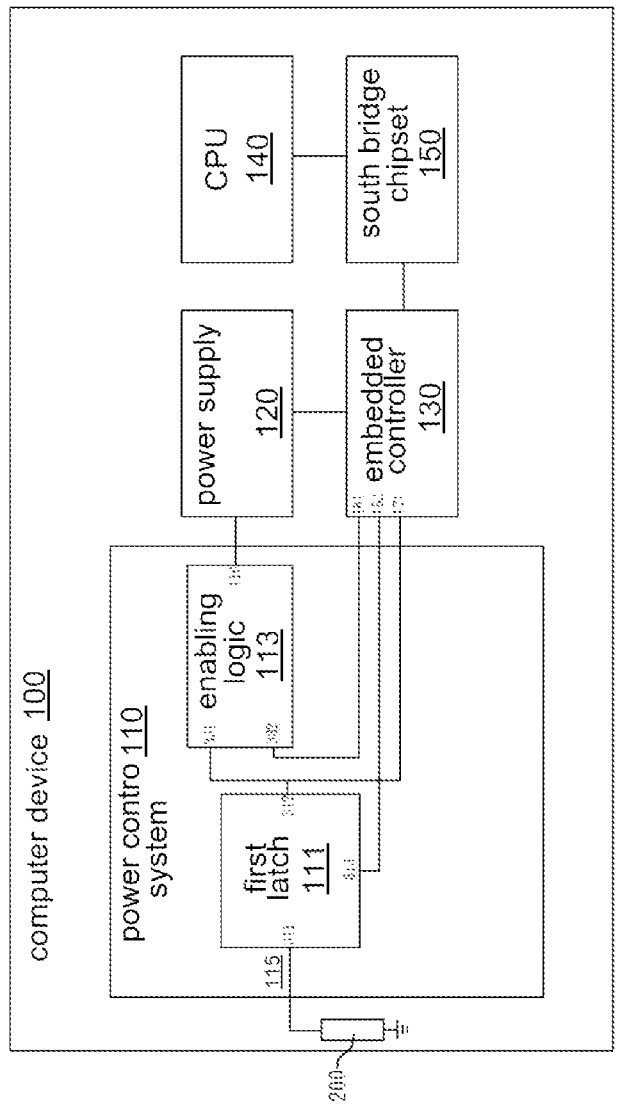
FIG. 2 is a block diagram of a power control system of a second embodiment.
Figure 3:
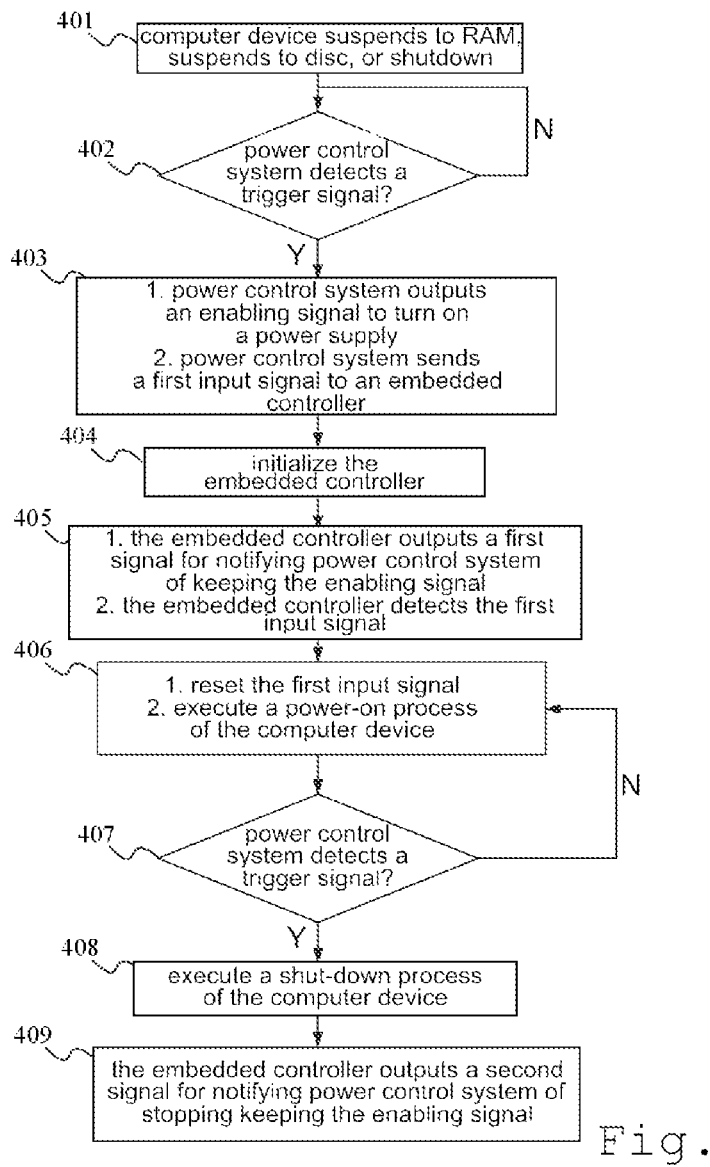
FIG. 3 is a flow chart of a power control method for a computer device of a second embodiment.

FIG. 2 is a block diagram of a power control system 110 of a second embodiment for the computer device 100. FIG. 3 is a flow chart of a power control method for a computer device in the second embodiment.

The power control system 110 of the second embodiment includes a first latch 111, an enabling logic 113, a switch input terminal 115 and a logic output terminal 116. The embedded controller 130 includes a first input terminal 171, a first output terminal 161 and a second output terminal 162. The switch input terminal 115 is in charge of receiving a trigger signal coming from a device switch component 200. The device switch component 200 can be but not limited to an external component such as a push-button or a dual in-line package switch, or an internal component like a timer. The trigger signal indicates the computer device to change a state, such as changing from a normal state to a suspend-to-RAM state, a suspend-to-disc state, or a shutdown state. The trigger signal can be but not limited to a pulse with a finite width or a digital logic signal.

The first latch 111 includes a first enabling input terminal 311, a first latch output terminal 312 and a first reset terminal 313. The first enabling input terminal 311 is coupled to the switch input terminal 115. The first latch output terminal 312 is coupled to the first input terminal 171. And the first reset terminal 313 is coupled to the second output terminal 162. When the first enabling input terminal 311 receives the trigger signal through the switch input terminal 115, the first latch output terminal 312 outputs a second logic level. And when the first reset terminal 313 receives a reset signal, the first latch output terminal 312 outputs a first logic level.

In more detail, the enabling logic 113 includes a first logic input terminal 331, a second logic input terminal 332 and a logic output terminal 116. The first logic input terminal 331 is coupled to the first latch output terminal 312. The second logic input terminal 332 is coupled to the first output terminal 161. The logic output terminal 116 is coupled to the power supply 120 and performs on-off control of the power supply 120. When any one of the input terminals of the control logic 113 receives the second logic level, the enabling logic 113 outputs an enabling signal through the logic output terminal 116 and turns on the power supply 120. And when all the input terminals of the enabling logic 113 receive the first logic level, the enabling logic 113 outputs a disabling signal and turns off the power supply 120. The implementation of the enabling logic 113 can be but not limited to a NOR logic gate.

As shown in FIG. 2 and FIG. 3, the operation of the power control system 110 and the embedded controller 130 is described as follows. When the computer device 100 is in a suspend-to-RAM state, a suspend-to-disc state, or a shutdown state, the power supply 120 is turned off and does not provide power to the embedded controller 130 (step 401 of FIG. 3). The switch input terminal 115 of the power control system 110 is in charge of detecting a trigger signal coming from an electronic signal of an external component or a timer in the computer device 100, wherein the timer may execute a real-time-clock process for waking up the computer device 100 (step 402 of FIG. 3). Once the switch input terminal 115 receives the trigger signal, the first latch 111 sends the second logic level to the enabling logic 113 and generates a first input signal on the first input terminal 171. The enabling logic 113 outputs an enabling signal accordingly to turn on the power supply 120 to provide power to the embedded controller 130 (step 403 of FIG. 3). The embedded controller 130 is then initialized (step 404 of FIG. 3). After finishing initialization, the embedded controller 130 outputs the second logic level on the first output terminal 161 for notifying the enabling logic 113 of keeping the enabling signal. The embedded controller 130 also detects the first input signal on the first input terminal 171 (step 405 of FIG. 3). The embedded controller 130 then outputs a reset signal on the second output terminal 162 to reset the output of the first latch 111 to the first logic level, that is, to reset the first input signal. Meanwhile the embedded controller 130 executes a power-on process of the computer device 100 and informs the south-bridge chipset 150 to provide power to the central processing unit 140. The computer device 100 is then in the normal state (step 406 of FIG. 3).

And when the computer device 100 is in the normal state, the switch input terminal 115 is in charge of detecting a trigger signal coming from the electronic signal of the external component or the timer in the computer device 100 wherein the timer may execute a real-time-clock process for shutting down the computer device 100 (step 407 of FIG. 3). Once the switch input terminal 115 receives the trigger signal, the first latch 111 outputs the second logic level to the first input terminal 171 for notifying the embedded controller 130 of executing a default process which changes the state of the computer device 100 to the suspend-to-RAM state, the suspend-to-disc state, or the shutdown state (step 408 of FIG. 3). After the default process is finished the embedded controller 130 outputs a reset signal on the second output terminal 162 to reset the output of the first latch 111 to the first logic level. Meanwhile the embedded controller 130 outputs the first logic level on the first output terminal 161 for notifying the enabling logic 113 of stopping keeping the enabling signal and outputting a disabling signal to turn off the power supply 120 and stop power of the embedded controller 130 to save the unnecessary power consumption (step 409 of FIG. 3).

Figure 4:
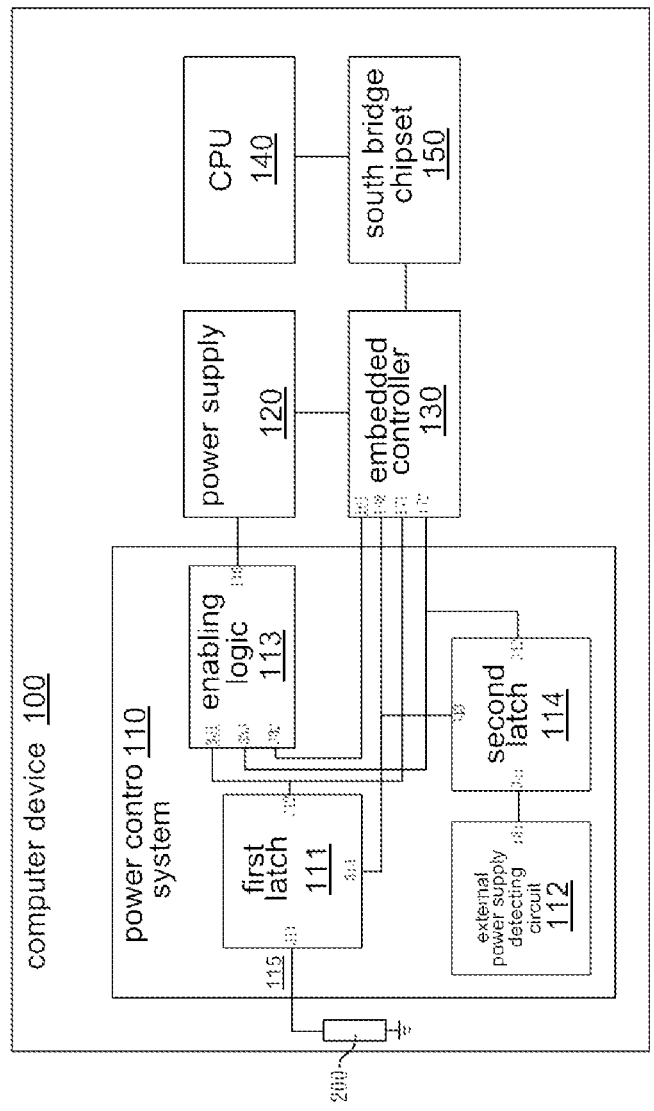
FIG. 4 is a block diagram of a power control system of a third embodiment.
Figure 5:
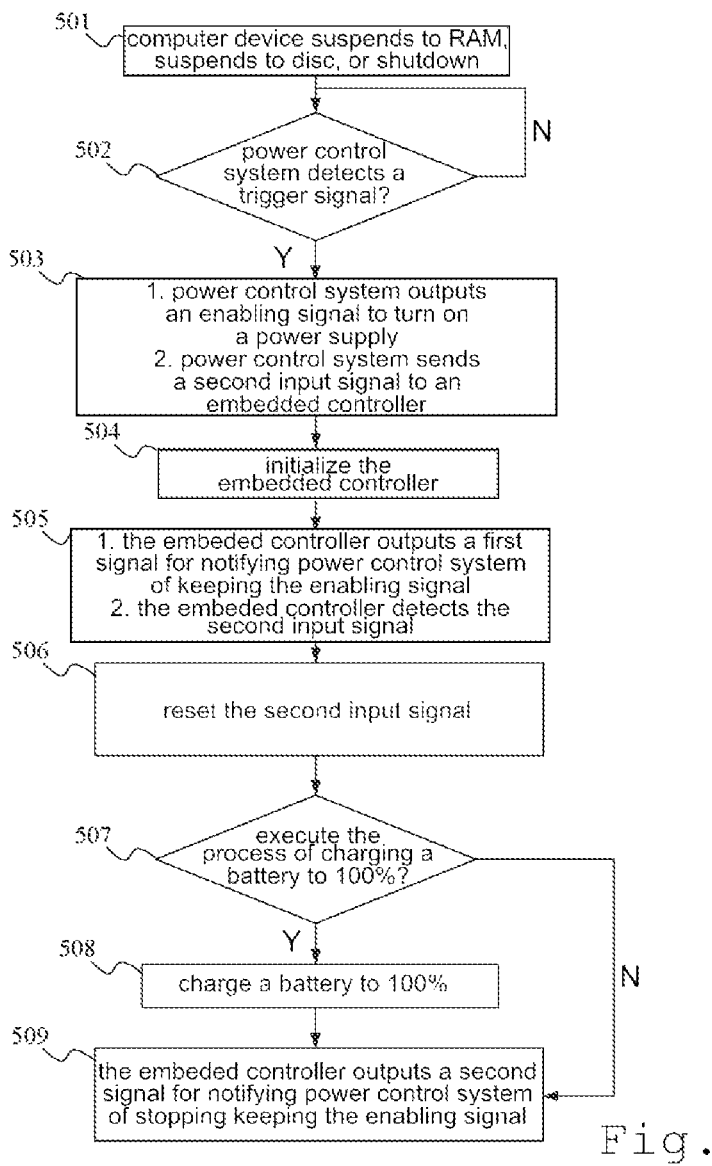
FIG. 5 is a flow chart of a power control method for a computer device of a third embodiment.

FIG. 4 is a block diagram of a power control system 110 of a third embodiment adopted in the computer device 100. FIG. 5 is a flow chart of a power control method for a computer device of a third embodiment.

Compared to the second embodiment, the power control system 110 of the third embodiment further includes a third logic input terminal 333, an external power supply detecting circuit 112 and a second latch 114. It is noted that the third logic input terminal 333 is the third input terminal of the enabling logic 113.

In more detail, the external power supply detecting circuit 112 has a detecting output terminal 181. When the external power supply detecting circuit 112 detects an external power supply, for example an external power supply plugged to the computer device 100 and enabled, it outputs an indication signal through the detecting output terminal 181. The external power supply can be but not limited to a power adaptor or a mobile charger, and the indication signal can be but not limited to a pulse with a finite width or a digital logic signal.

The second latch 114 has a second enabling input terminal 341, a second latch output terminal 342 and a second reset terminal 343. The second enabling input terminal 341 is coupled to the detecting output terminal 181. The second reset terminal 343 is coupled to the second output terminal 162. The second latch output terminal 342 is coupled to the second input terminal 172 and the third logic input terminal 333. When the second enabling terminal 341 receives the indication signal, the second latch output terminal 342 outputs the second logic level. And when the second reset terminal 343 receives the reset signal, the second latch output terminal 342 output the first logic level.

It is noted that the second latch 114 and the external power supply detecting circuit 112 can be incorporated into a single component in practice. However, in this embodiment, the second latch 114 serves as an independent component for maintaining the indication signal.

In this embodiment, the enabling logic 113 has three input terminals and functions the same as that in the second embodiment. That is, when any one of the input terminals of the control logic 113 receives the second logic level, the enabling logic 113 outputs an enabling signal through the logic output terminal 116 and turns on the power supply 120. And when all the input terminals of the enabling logic 113 receive the first logic level, the enabling logic 113 outputs a disabling signal and turns off the power supply 120.

As shown in FIG. 4, besides the disclosed operation in the second embodiment (the flow chart disclosed in FIG. 3), further operation and functions of the power control system 110 and the embedded controller 130 are disclosed in the third embodiment as in the following descriptions. When the computer device 100 is in the suspend-to-RAM state, the suspend-to-disc state, or the shutdown state, the power supply 120 is shut down and does not provide power to the embedded controller 130 (step 501 of FIG. 5). The external power supply detecting circuit 112 is in charge of detecting an external power supply (step 502 of FIG. 5). When the external power supply detecting circuit 112 detects an external power supply, for example an external power supply plugged to the computer device 100 and enabled, it sends an indication signal through the detecting output terminal 181 to the second latch 114. After receiving the indication signal, the second latch 114 sends the second logic level to the third logic input terminal 333 and generates a second input signal on the second input terminal 172. The enabling logic 133 then outputs an enabling signal accordingly to turn on the power supply 120 which supplies power to the embedded controller 130 (step 503 of FIG. 5). The embedded controller is then turned on and initialized (step 504 of FIG. 5). After finishing initialization the first output terminal 161 outputs the second logic level to render the enabling logic 113 keeping the enabling signal. And also the second input signal is generated on the second input terminal 172 (step 505 of FIG. 5). The embedded controller 130 then outputs a reset signal through the second output terminal 162 to reset the output of the second latch 114 to the first logic level, that is, to reset the second input signal (step 506 of FIG. 5). Then a default process, for example determining if a battery of the computer device 100 should be charged to one hundred percentages, is executed (step 501 of FIG. 7). If charging should be proceeded, the computer device 100 charges the battery to one hundred percentages with the external power supply (step 508 of FIG. 5). If charging should not be proceeded or the battery has been charged to one hundred percentages, the embedded controller 130 outputs the first logic level through the first output terminal 161 to render the enabling logic 113 stopping keeping the enabling signal to turn off the power supply 120 and stop the power of the embedded controller 130 (step 509 of FIG. 5). Thus saves unnecessary current consumption.

Figure 6:
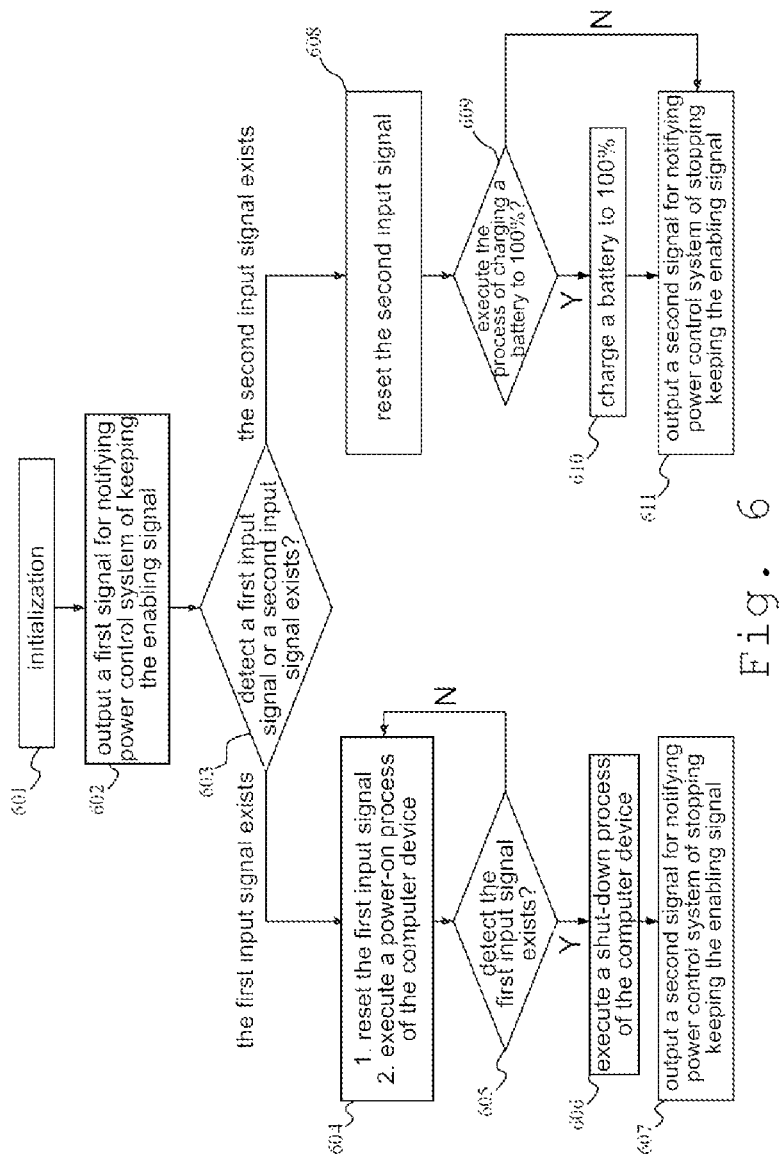
FIG. 6 is a flow chart of an embedded controller of a power control system.

FIG. 6 is a flow chart of operations of an embedded controller of a power control system. The flow chart illustrates the power control method of the third embodiment and can be adopted for implementing the firmware code of the embedded controller. The power control method comprises the following steps (steps 601-611).

As shown in step 601, the embedded controller starts and then finishes initialization. The step corresponds to the operation that the power control system outputs an enabling signal to turn on the power supply providing power to the embedded controller.

As shown in step 602, the embedded controller outputs a first signal for notifying the power control system of keeping the enabling signal.

As shown in step 603, the embedded controller detects if a first input signal or a second input signal exists. The step determines which signal turns on the computer device and the following actions are executed correspondingly.

As shown in step 604, if the embedded controller detects the first input signal, the action as that in step 406 of FIG. 3 is executed.

As shown in step 605, the embedded controller keep detecting the first signal, and if the first signal is not detected, go back to step 604.

As shown in step 606, the action as that in step 408 of FIG. 3 is executed.

As shown in step 607, the action as that in step 409 of FIG. 3 is executed.

As shown in step 608, if the embedded controller detects the second input signal, the action as that in step 506 of FIG. 5 is executed.

As shown in step 609, the action as that in step 507 of FIG. 5 is executed.

As shown in step 610, the action as that in step 508 of FIG. 5 is executed.

As shown in step 611, the action as that in step 509 of FIG. 5 is executed.

This disclosure is advantageous because by a power control system controlling a power supply in a computer device, a power of an embedded controller in the computer device is either not supplied when not on duty or supplied to maintain the normal operation of the computer device such as power-on of the computer device or a specific process like charging a battery by an external power supply. By cutting the power of the embedded controller when not on duty, the power consumption of the computer device can be effectively decreased when the computer device is in a suspend-to-RAM mode, a suspend-to-disc mode, or a shutdown mode. Thus the computer device is advantageous to comply with energy standards regulated all around the world, and the long stand-by time is also a strong feature for an electronic product.

The aforementioned descriptions represent merely the preferred embodiment of this disclosure, without any intention to limit the scope of this disclosure thereto. Various equivalent changes, alterations, or modifications based on the claims of this disclosure are all consequently viewed as being embraced by the scope of this disclosure.

What is claimed is:

1. A power control system for a computer device comprising an embedded controller and a power supply, the power supply providing power to the embedded controller, the embedded controller comprising a first input terminal, a first output terminal and a second output terminal, the power control system comprising:
   a switch input terminal;
   a first latch, comprising a first enabling input terminal, a first latch output terminal and a first reset terminal, wherein the first enabling input terminal is coupled to the switch input terminal, the first latch output terminal is coupled to the first input terminal, and the first reset terminal is coupled to the second output terminal, when the first enabling input terminal receives a trigger signal through the switch input terminal from a component of the computer device to change a state of the computer device, the first latch output terminal outputs a second logic level, and when the first reset terminal receives a reset signal, the first latch output terminal outputs a first logic level; and
   an enabling logic, comprising a first logic input terminal, a second logic input terminal and a logic output terminal, wherein the first logic input terminal is coupled to the first latch output terminal, the second logic input terminal is coupled to the first output terminal, the logic output terminal is coupled to the power supply and performs on-off control of the power supply; when any one of the input terminals of the control logic receives the second logic level, the enabling logic outputs an enabling signal through the logic output terminal to turn on the power supply, and when all the input terminals of the enabling logic receive the first logic level, the enabling logic outputs a disabling signal to turns off the power supply;
   wherein when the embedded controller is turned on and finishes initialization, the first output terminal outputs the second logic level, and the second output terminal outputs the reset signal; when the switch input terminal receives the trigger signal again to render the first latch output terminal outputting the second logic level, the first output terminal outputs the first logic level and the second output terminal outputs the reset signal.

2. The power control system of claim 1, further comprising a device switch component coupled to the switch input terminal and optionally outputting the trigger signal to the power control system to change the state of the computer device to a normal state, a suspend-to-RAM state, a suspend-to-disc state, or a shutdown state.

3. The power control system of claim 2, wherein the device switch component comprises a push-button or a dual in-line package switch.

4. The power control system of claim 1, further comprising a timer coupled to the switch input terminal and optionally sending the trigger signal to the power control system to change the state of the computer device to a normal state, a suspend-to-RAM state, a suspend-to-disc state, or a shutdown state.

5. The power control system of claim 1, wherein the embedded controller further comprises a second input terminal, and the power control system further comprises:

a third logic input terminal, which is the third input terminal of the enabling logic;

an external power supply detecting circuit, having a detecting output terminal which outputs an indicating signal when the external power supply detecting circuit detects an external power; and a second latch, having a second enabling input terminal, a second latch output terminal and a second reset terminal, wherein the second enabling input terminal is coupled to the detecting output terminal, the second reset terminal is coupled to the second output terminal, the second latch output terminal is coupled to the second input terminal and the third logic input terminal, when the second enabling terminal receives the indicating signal, the second latch output terminal outputs the second logic level, and when the second reset terminal receives the reset signal, the second latch output terminal outputs the first logic level;

wherein when the embedded controller is turned on and finishes initialization, the signals on the first input terminal and the second input terminal determines which process should be executed in the embedded controller.

6. The power control system of claim 5, wherein the external power supply is a power adaptor or a mobile charger.

7. A power control method for a computer device having an embedded controller, comprising:

sending an enabling signal by a power control system to turn on a power supply if the computer device is in a suspend-to-RAM state, a suspend-to-disc state, or a shutdown state and a trigger signal is detected by the power control system;

powering and initializing the embedded controller using the power supply;

sending a first input signal to the embedded controller by the power control system in response to the trigger signal;

sending a first signal by the embedded controller for notifying the power control system of keeping the enabling signal when the initialization of the embedded controller is finished;

executing a power-on process of the computer device and resetting the first input signal by the embedded controller if the first input signal is detected by the embedded controller;

sending the first input signal by the power control system for notifying the embedded controller of executing a shut-down process of the computer device if the power control system detects the trigger signal again; and sending a second signal by the embedded controller for notifying the power control system of stopping keeping the enabling signal, thereby turning off the power supply and stopping the power of the embedded controller when the shut-down process is finished.

8. The power control method of claim 7, further comprising:

sending the enabling signal by the power control system to turn on the power supply and sending an indication signal by an external power supply detecting circuit of the power control system if the computer device is in the suspend-to-RAM state, the suspend-to-disc state, or the shutdown state and the external power supply detecting circuit detects an external power supply;

powering and initializing the embedded controller using the power supply;

sending a second input signal to the embedded controller by the power control system in response to the indication signal;

sending a signal by the embedded controller for notifying the power control system of keeping the enabling signal when the initialization of the embedded controller is finished;

resetting the second input signal by the embedded controller and executing a process of the computer device if the second input signal is detected by the embedded controller; and sending a signal by the embedded controller for notifying power control system of stopping keeping the enabling signal, thus turning off the power supply and stopping power of the embedded controller when the process is finished.

9. The power control method of claim 8, wherein the process is to determine if a battery of the computer device should be charged to one hundred percentage; if yes, the computer device charges the battery with the external power supply.

* * * * *